United States Patent [19]

Asai et al.

[11] 4,005,487
[45] Jan. 25, 1977

[54] TAPE-OPERATING APPARATUS ADAPTED FOR USE EITHER WITH AN ENDLESS LOOP TYPE CARTRIDGE OR A COPLANAR TYPE CASSETTE

[75] Inventors: Satosi Asai, Annaka; Isamu Matsuki, Maebashi, both of Japan

[73] Assignee: Matsuki-Seisakusho, Maebashi, Japan

[22] Filed: June 26, 1975

[21] Appl. No.: 590,477

[30] Foreign Application Priority Data

Oct. 31, 1974 Japan .............................. 49-125766

[52] U.S. Cl. ................................................. 360/94
[51] Int. Cl.² .................. G11B 15/00; G11B 21/00
[58] Field of Search ............................... 360/94, 96

[56] References Cited

UNITED STATES PATENTS

| | | |
|---|---|---|
| 3,578,261 | 5/1971 | Yamamoto et al. .................. 360/96 |
| 3,594,008 | 7/1971 | Takagi et al. ......................... 360/94 |
| 3,703,295 | 11/1972 | Yamamoto et al. .................. 360/94 |

*Primary Examiner*—Robert S. Tupper
*Attorney, Agent, or Firm*—Steele & Petock

[57] ABSTRACT

A tape-operating apparatus adapted for use either with an endless tape type cartridge or a coplanar type cassette which comprises a fixed frame having a common free space for admission of said cartridge and cassette; a movable frame for supporting cassette tape operating device including a magnetic head; and actuating means for setting the movable frame in an operative position, wherein the actuating means is not put into operation by the inserted cartridge but by the inserted cassette.

3 Claims, 21 Drawing Figures

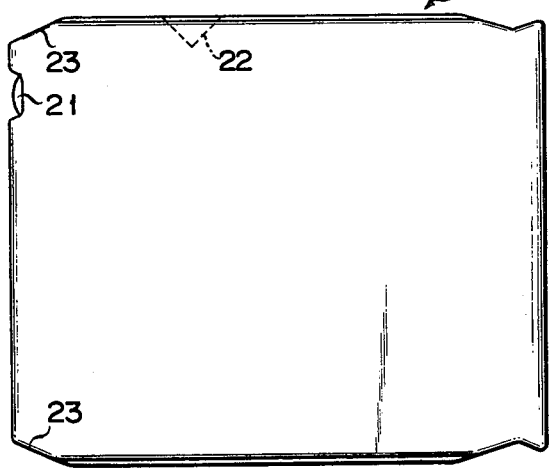
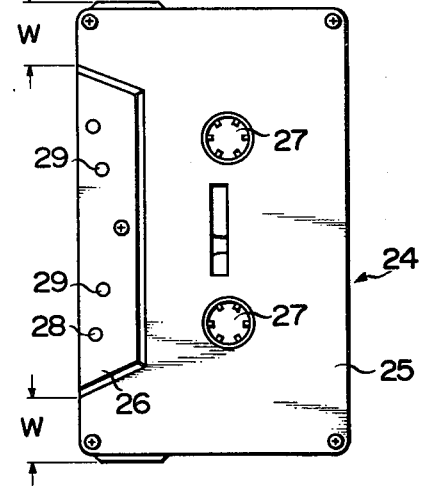
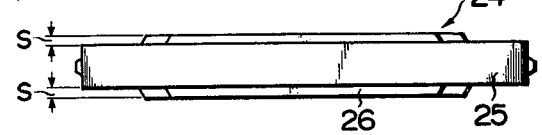
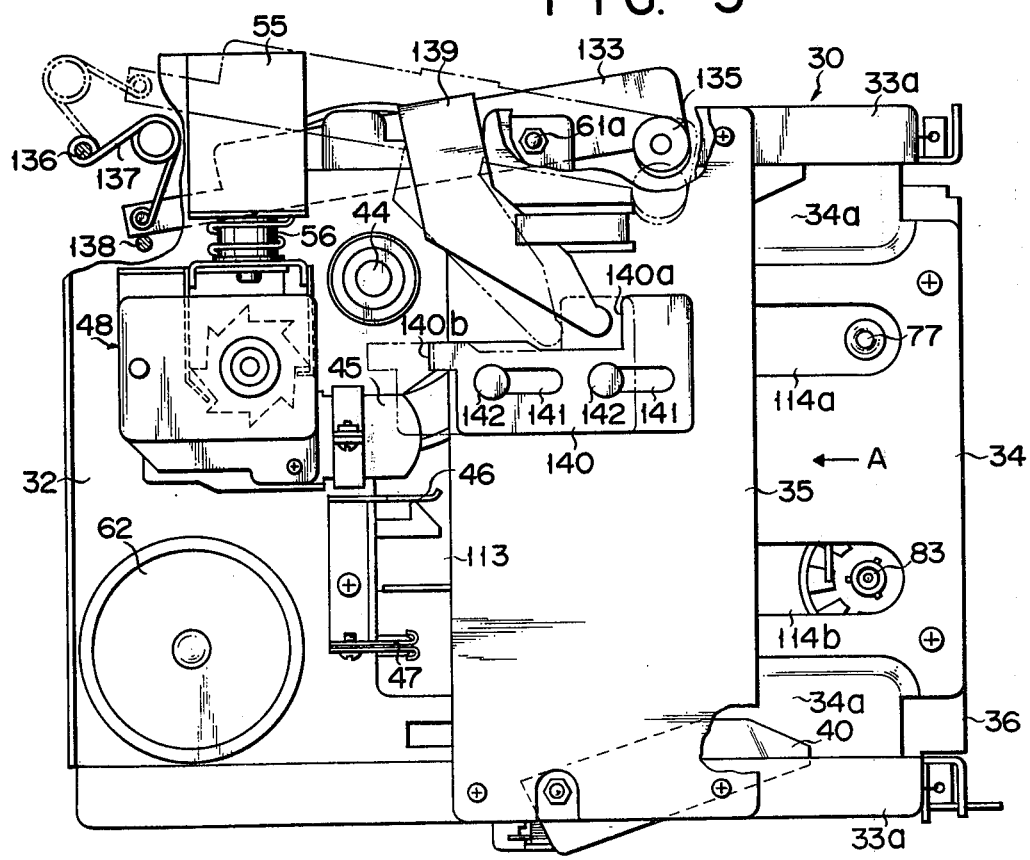

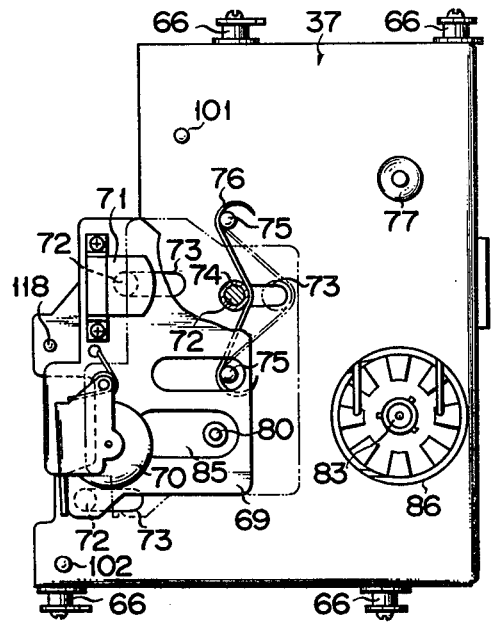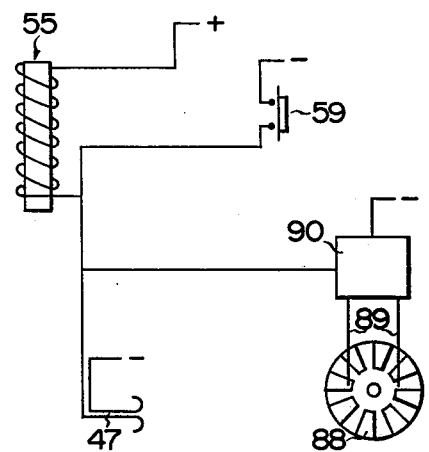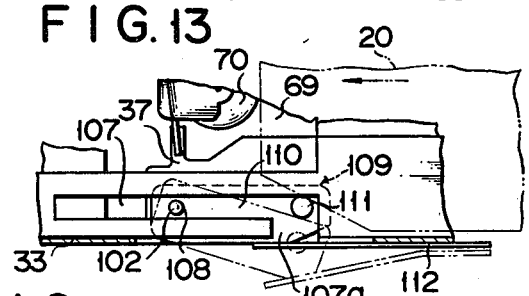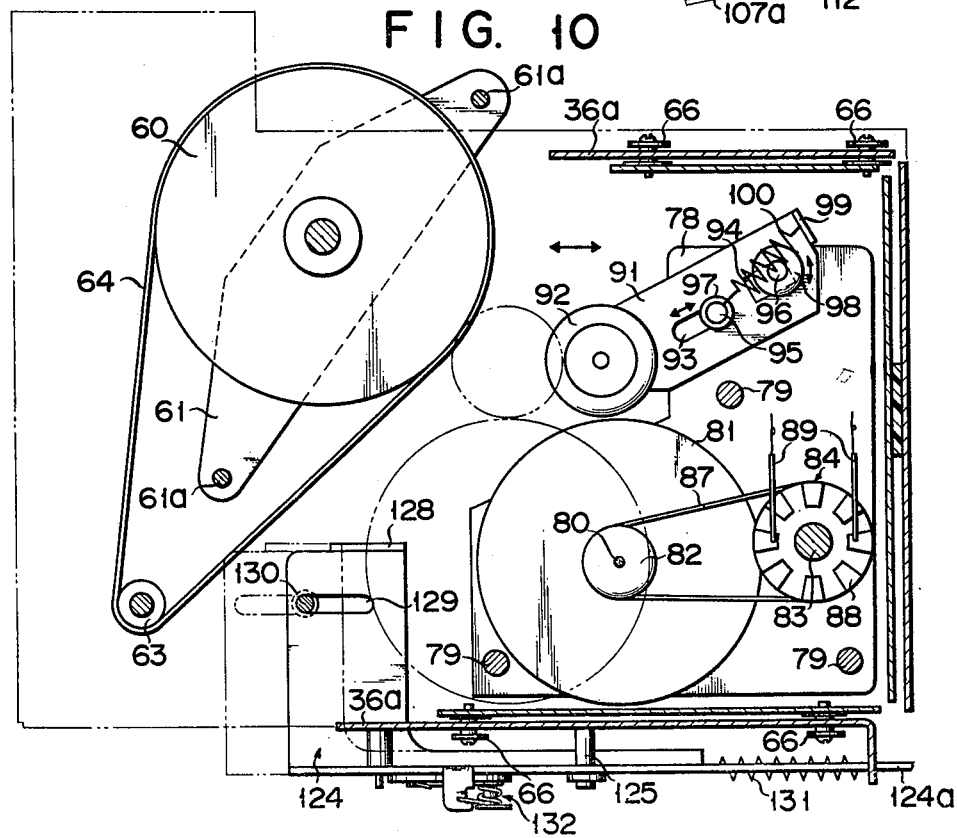

TAPE-OPERATING APPARATUS ADAPTED FOR USE EITHER WITH AN ENDLESS LOOP TYPE CARTRIDGE OR A COPLANAR TYPE CASSETTE

BACKGROUND OF THE INVENTION

This invention relates to a tape-operating apparatus for recording and/or reproducing sounds which is adapted for use with either an endless loop type cartridge or a coplanar type cassette.

Ordinary compact magnetic tape holders are broadly divided into an endless loop type cartridge and a coplanar type cassette. These tape holders having different characteristics and shapes, requiring separate sound recording and reproducing devices, as has been the case in the past. If a single sound recording and reproducing device could be developed which is adapted for use with both types of tape holder, then recording and reproduction of sounds would be effected very conveniently. Under the present circumstances, however, an attempt to incorporate two forms of sound recording and reproducing function in a single device would unavoidably render said device bulky, and complicated in mechanism, giving rise to difficulties in operation.

SUMMARY OF THE INVENTION

It is accordingly an object of this invention to provide a compact magnetic tape-operating apparatus of simple arrangement for recording and/or reproducing sounds which is adapted for concurrent use with either an endless loop type cartridge or a coplanar type cassette.

Another object of the invention is to provide a compact magnetic tape-operating apparatus for recording and/or reproducing sounds which enables a cassette tape-operating device to be automatically set in an operative position only when the cassette is to be used.

A magnetic tape-operating apparatus for recording and/or reproducing sounds (hereinafter simply referred to as a "tape-operating" apparatus) according to this invention comprises a fixed frame defining a common free space for admission of the cartridge and cassette; a movable frame mounted on the fixed frame so as to hold cassette tape-operating device and move from an inoperative to an operative position; and actuating means disposed in the free space so as to bring the movable frame to an operative position upon insertion of the cassette.

With the tape-driving apparatus of this invention, the actuating means is not driven by the inserted cartridge but by the inserted cassette to bring the movable frame to an operative position. This arrangement eliminates the necessity of providing particular means for changing over operation from the cartridge to the cassette, or for the user to carry out any changeover work.

BRIEF DESCRIPTION OF THE DRAWING

FIGS. 1A and 1B are miniature plan and side views of a typical endless loop type cartridge;

FIGS. 2A and 2B are miniature plan and side views of a typical coplanar type cassette;

FIG. 3 is a plan view, partly in section, of the tape-driving apparatus of this invention;

FIG. 9 schematically shows a solenoid-exciting circuit;

FIG. 10 is a sectional view on line 10—10 of FIG. 4;

FIG. 11 is a plan view of a movable frame;

FIG. 13 is a plan view, partly in section, of the frame, showing a second actuating member;

DETAILED DESCRIPTION OF THE PREFERRED EMBODIMENTS

Figure 4:
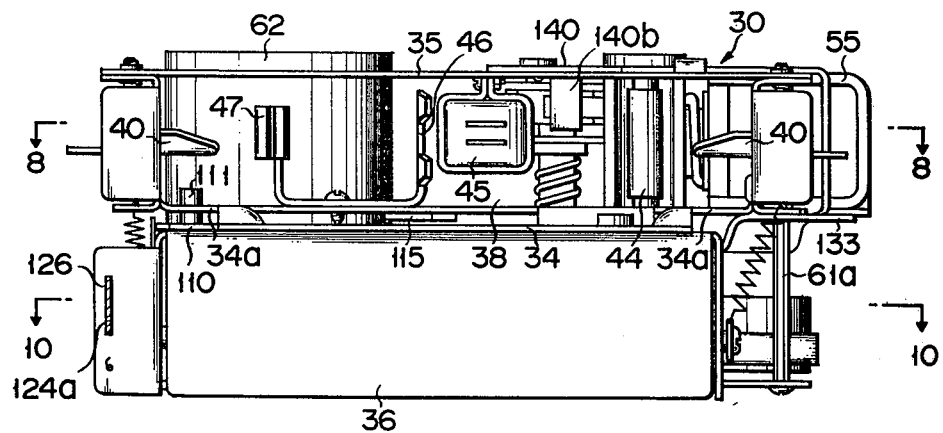
FIG. 4 is a right side view of the same.

FIGS. 1A and 1B show the known endless loop type cartridge 20 ("Lear Jet" type 8-track cartridge). The cartridge 20 containing a pinch roller 21 has substantially flat upper and lower surfaces and is provided on one lengthwise side with a depression 22 cut out with a V-shaped cross section and further with a pair of chamfered portions 23 at both corners of the insertion side.

FIGS. 2A and 2B illustrate the known coplanar type cassette 24. The cassette 24 consists of a body 25 for receiving tape reels and a thicker portion 26 extensively formed over the lengthwise center of the cassette 24, into which the magnetic head and pinch roller are inserted in application. The thicker portion 26 is spaced for a distance W from both crosswise sides of the body 25 and projects to a height S from the upper and lower surfaces of the body 25. The body 25 is bored with holes 27 for insertion of reel shafts, and the thicker portion 26 is bored with holes 28, 29 for insertion of a capstan and set pins. The cassette 24 has a lengthwise width substantially equal to the crosswise width of the cartridge 20 and a smaller thickness and length than the cartridge 20.

The tape-operating apparatus of this invention is constructed in consideration of the different shapes and functions of the cartridge and cassette.

FIGS. 3 to 6 jointly present a compact tape-operating apparatus used, for example, with automobiles. The apparatus has a frame assembly 31 including an upper frame unit 32 having a pair of parallel upright lengthwise walls 33 with a bottom plate 34 disposed therebetween, an upper plate 35 screwed to flaps 33a formed on the lengthwise walls 33 of the upper frame unit 32 and a lower frame unit 36 screwed to the underside of the upper frame unit 32. The later described movable frame 37 is movably held in the lower frame unit 36 (FIG. 7). The upper frame unit 32 and upper frame plate 35 jointly define a common free space 38 (FIG. 4) for admission of the cartridge 20 and cassette 24. The width of the free space 38, namely, an interval between the lengthwise walls 33 of the upper frame unit 32 is made substantially equal to the insertion width of the cartridge 20 and cassette 24. The bottom plate 33 of the upper frame unit 32 has a pair of raised portions 34a formed on both lengthwise sides. These raised portions 34a extend parallel at an interval substantially equal to the lengthwise width of the thicker portion 26 of the cassette 24, and rise above the upper surface of the bottom plate 33 to a height substantially equal to the height S of the thicker portion 26. An interval between the upper plane of the raised portions 34a and the underside of the upper plate 35 is made substantially equal to the thickness of the cartridge 20.

Figure 5:
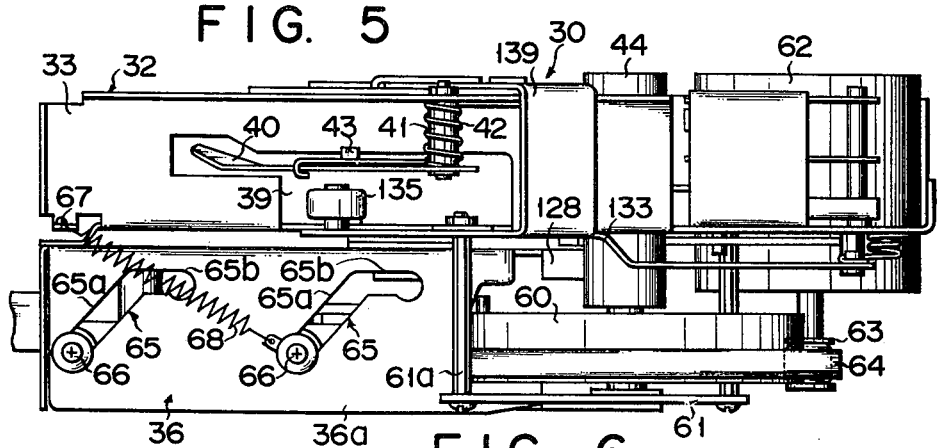
FIG. 5 is a back view of the same.
Figure 6:
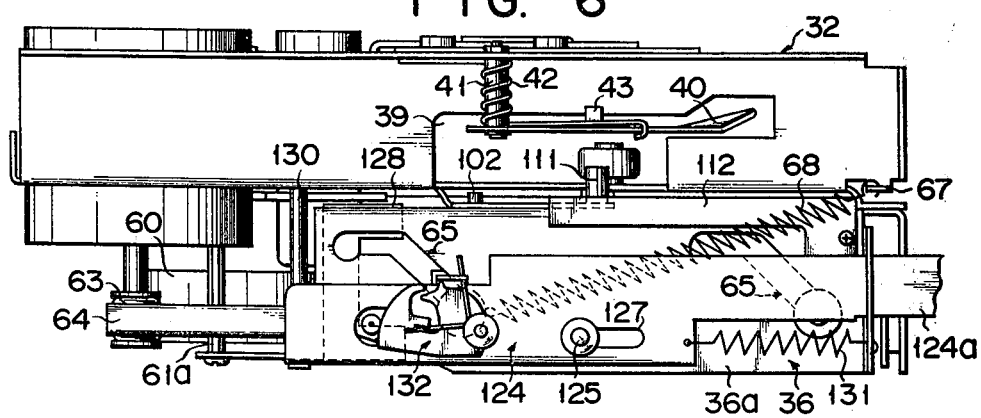
FIG. 6 is a front view of the same.
Figure 7:
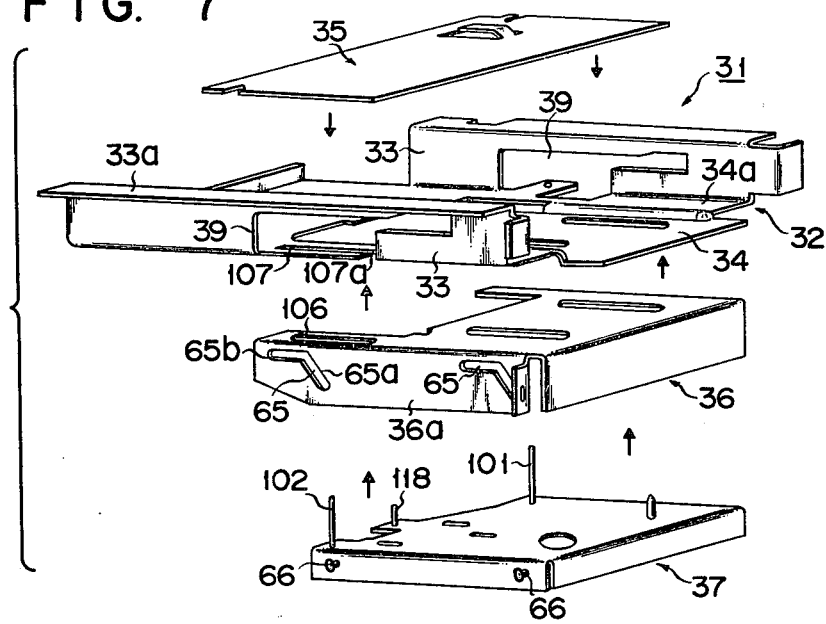
FIG. 7 is a miniature exploded view of a frame.
Figure 8:
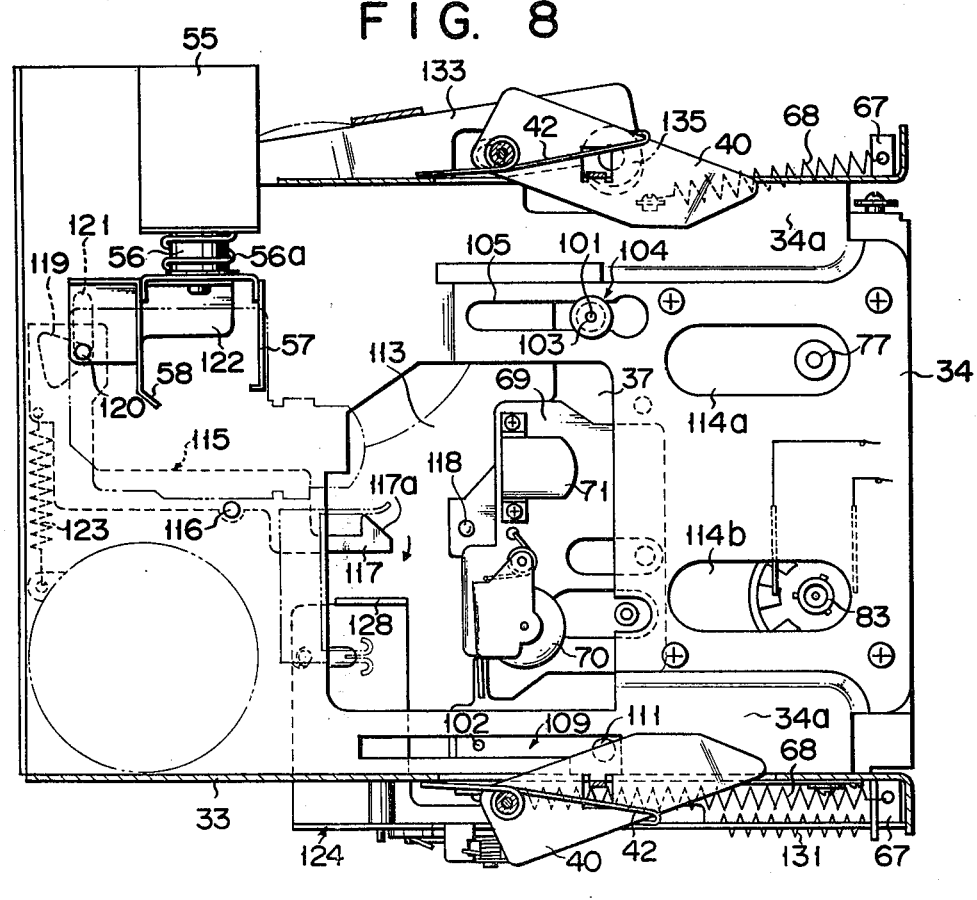
FIG. 8 is a sectional view on line 8—8 of FIG. 4.

The lengthwise walls 33 of the upper frame unit 32 are each bored with a hole 39 in which a plate-like guide member 40 is received (FIGS. 5, 6 and 8). Each guide member 40 is fitted at one end to the lower end of a support rod 41 fixed to the flap 33a of the upper frame unit 32 so as to rotate in a substantially horizontal direction. The guide member 40 is urged into the free space 38 through the hole 39 by a torsion coil spring 42 for abutment against the lengthwise wall 33 of the upper frame unit 32 through a stopper 43. An interval between the underside of the guide member 40 and the upper plane of the raised portion 34a is made substantially equal to the thickness of the body 25 of the cassette 24. Means for driving a cartridge tape including a capstan 44, magnetic head 45, tape guide 46 and conductor 47 is provided in the forward portion of the upper frame unit as viewed in the direction indicated by the arrow A of FIG. 3, namely, in the direction in which the cartridge 20 is inserted with the free space 38 (FIGS. 3 and 4). If will be noted that the terms "forward portion" and "rear portion" are defined to mean those as viewed in the direction in which the cartridge and cassette are pushed into the free space 38.

The magnetic head 45 is attached to the known tape track-changing mechanism 48 mounted on the upper frame unit 32. The tape track-changing mechanism 48 includes a solenoid 55 (FIG. 8) having a slidable rod 56. When retracted by excitation of the solenoid 55, the rod 56 vertically moves the magnetic head 45 as is well known. The solenoid 55 is excited when a metal foil attached to the cartridge tape touches the conductor 47 and also when a switch 59 is closed (FIG. 9).

The capstan 44 penetrates the upper frame unit 32 and is provided at the lower end with a fly-wheel 60 (FIG. 5). The known electric motor 62 is fixed to the upper frame unit 32. The rotary shaft of the motor 62 extends below the upper frame unit 32 and is provided at the lower end with a pulley 63. A rubber belt 64 is operatively stretched between the pulley 63 and fly-wheel 60. Both lengthwise walls 36a of the lower frame unit 36 are each bored with two guide slots 65 of substantially the same shape. Each guide slot 65 consists of an inclined portion 65a extending obliquely upward and a horizontal portion 65b extending horizontally from the upper end of said inclined portion 65a (FIG. 5). The movable frame 37 disposed below the lower frame unit 36 is supported in a horizontal state by guide rollers 66 which are movably engaged with the guide slots 65, respectively. Tension springs 68 are stretched between the forward guide rollers 66 and lugs 67 formed on the upper frame unit 32 so as to urge the movable frame 37 rearward and downward (to an inoperative position).

The movable frame 37 is fitted with the cassette tape-driving means. As shown in FIG. 11 a movable plate 69 holding a cassette tape pinch roller 70 and magnetic head 71 is mounted on the forward upper portion of the movable frame 37. The movable plate 69 has support rods 72 slidably engaging elongate guide slots 73 bored in the movable frame 37 and is spaced at a prescribed interval from the upper surface of the movable frame 37 by spacer rings 74 surrounding the support rods 72. The movable frame 37 is fitted with a pair of cassette-setting pins 75, across which a wire spring 76 is stretched. The wire spring 76 is pressed at the center against one of the support rods 72 to urge the movable plate 69 forward. A fixed cassette tape reel shaft 77 is fixed to the movable frame 37 so as to project upward therefrom.

The movable frame 37 has a bottom plate 78 fixed to the underside thereof by support rods 79 (FIG. 10). A cassette tape capstan 80 provided with a fly-wheel 81 and pulley 82 and a tape takeup reel shaft 83 provided with a pully 84 are rotatably supported on the bottom plate 78. The capstan 80 and tape takeup reel shaft 83 penetrate the movable shaft so as to project thereabove. A belt 87 is operatively stretched between the pulleys 82, 84. The pulley 84 of the tape takeup reel shaft 83 has the known detection means 89 including a solenoid exciting circuit 90 (FIG. 10). The solenoid exciting circuit 90 actuates the solenoid 55 when the pulley 84 is brought to rest. A support plate 91 holding a rubber idler 92 is mounted on the bottom plate 82. The idler 92 is adapted to be operatively coupled to the fly-wheel 81 when the cassette 24 is inserted into the free space 38.

Figure 12:
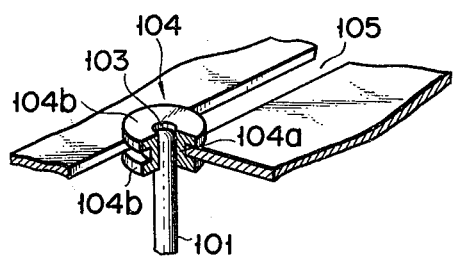
FIG. 12 is an oblique view, partly in section, of the frame, showing a first actuating member.

The tape operating apparatus of this invention comprises actuating means for bringing the movable frame 37, cassette tape pinch roller 70, magnetic head 71 and capstan 80 all to an operative position. A pair of forwarding pins 101, 102 project above the movable frame 37 as shown in FIG. 11. One pin 101 is slidably inserted into the central hole 103 of the first actuating member 104 engaging an elongate slot 105 formed in the bottom plate 34 of the upper frame unit 32. The first actuating member 104 comprises, as shown in FIG. 12, a smaller diameter portion 104a slidable through the elongate slot 105 and a pair of collars 104b clamping the bottom plate 34 of the upper frame unit 32 from above and below. The upper collar 104b has a smaller thickness then the height of the raised portion 34a of the bottom plate 34 of the upper frame unit 32. The other forwarding pin 102 passes through an elongate slot 106 (FIG. 7) formed in the lower frame unit 36, a through hole 108 bored in the second actuating member 109 and an elongate slot 107 provided in the raised portion 33a of the upper frame unit 32. The second actuating member 109 (FIG. 13) consists of a substantially rectangular plate 110 slidably resting on the lower frame unit 36. The plate 110 is provided with an engagement pin 111 projecting above the slot 107, and urged into the free space 38 by a relatively weak leaf spring 112 fixed to the lower frame unit 36. The engagement pin 111 is so disposed as to be pressed against the chamfered surfaces 23 of the cartridge when it is pushed into the free space 38. The slot 107 of the upper frame unit 32 has an escapement slot 107a for allowing the engagement pin 111 to be forced out of the free space 38 when the cartridge is inserted thereinto. The rear side of the upper collar 104b of the first actuating member 104 and the rear side of the engagement pin 111 of the second actuating member 109 fall on a line rectangularly intersecting the direction in which the cassette 24 is inserted into the free space 38. The upper collar 104b and engagement pin 111 are so disposed as to cause the cassette tape capstans 80, set pins 75 and reel shafts 77, 83 to be vertically aligned with the corresponding holes 28, 29, 27 of the cassette when it is pressed against the first and second actuating members 104, 109. The bottom plate 34 of the upper frame unit 32 is bored with a hole 113 for insertion of the movable plate 69 and slots 114a, 114b for insertion of the reel shafts 77, 78 in order to cause the movable frame 37 and the cassette tape-driving means to be freely brought to an operative position.

A lock mechanism for keeping the movable frame 37 in an operative position is provided, as shown in FIG. 8, below the upper frame unit 32. The lock mechanism has a lock arm 115 swingably fitted to the underside of the upper frame unit 32 by a pin 116. The lock arm 115 has a pawl 117 engageable with a pin 118 formed in the forward portion of the movable frame 37. The lock arm 115 is normally urged by a tension spring 123 to a position shown in FIG. 8, but is rotated clockwise by a pin 120 when the solenoid 55 is excited.

The tape-operating apparatus of this invention further comprises a tape-fast forwarding arm 124 provided with a stopper 128 for the movable plate 69 of the movable frame 37 (FIGS. 6 and 10). The tape-fast forwarding arm 124 is supported on the lower frame unit 36 so as to move between the rear or normal position and the forward or fast forwarding position.

The tape-operating apparatus of the invention further comprises a cartridge pressing mechanism. This pressing mechanism is formed, as shown in FIG. 3, of a support plate 133 rotatably mounted on the upper frame unit 32 and a press roller 135 fitted to the support plate 133. The support plate 133 is normally kept in an inoperative position shown in a solid line in FIG. 3 by a torsion coil spring 137. When, however, the inserted cartridge pushes forward the projection 140b of a plate 140 which engages an arm 139 of the plate 133, (FIGS. 3 and 4), then the support plate 133 is shifted to an operative position indicated in a chain line in FIG. 3.

The aforesaid tape-fast forwarding mechanism and the cartridge pressing mechanism, which fall outside of the object of this invention and fully explained in the applicants' copending patent applications of the same filing date as the present application, needs no further explanation.

Figure 14A:
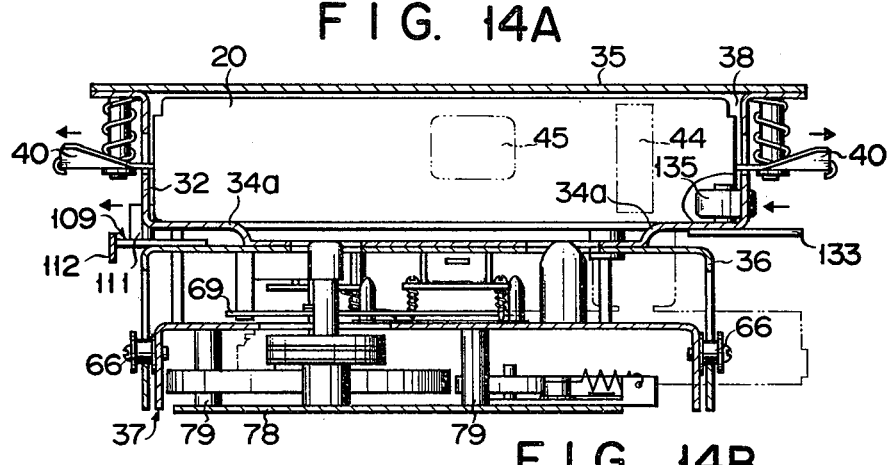
FIGS. 14A and 14B set forth the inserted cartridge and cassette respectively, as viewed in the direction in which they are inserted into the free space.

There will now be described the operation of the subject tape-operating apparatus. When the cartridge 20 is pushed into the free space 38 in the direction indicated by the arrow A of FIG. 3, then both guide members 40 are forced, as shown in FIG. 14A, out of the free space by the inserted cartridge 20 so as to guide the lengthwise walls thereof. At this time, the engagement pin 111 of the second actuating member 109 is forced into the escapement slot 107a by the chamfered portion 23 against the force of the spring 112 (as indicated in a chain line in FIG. 13). The cartridge which is now placed on the raised portions 34a of the bottom plate 34 of the upper frame unit 32 passes over the first actuating member 104 without touching it. Thus, when the cartridge 20 is initially inserted into the free space 38, the first and second actuating members 104, 109 and in consequence the movable frame 37 remain inoperative. When the cartridge 20 is pushed further into the free space 38, then the forward end face of the cartridge 20 depresses the projection 140b to bring the press roller 135 to a position indicated in a chain line in FIG. 3. As the result, the press roller 135 is tightly fitted into the depression 22, causing the cartridge tape to be firmly pressed against the capstan 44, tape guide 46 and conductor 47. At this time, the forward end of the cartridge 20 actuates the known switch means (not shown), and in consequence a sound recording and reproducing circuit (not shown) for the cartridge tape. When the cartridge is pulled out after completion of the operation of the tape, the press roller 135 is brought back to the solid line position of FIG. 3 by the inner walls of the depression 22, and the engagement pin 111 is moved into the initial position by the spring 112. At the same time, the above-mentioned switch means is automatically thrown open.

Figure 14B:
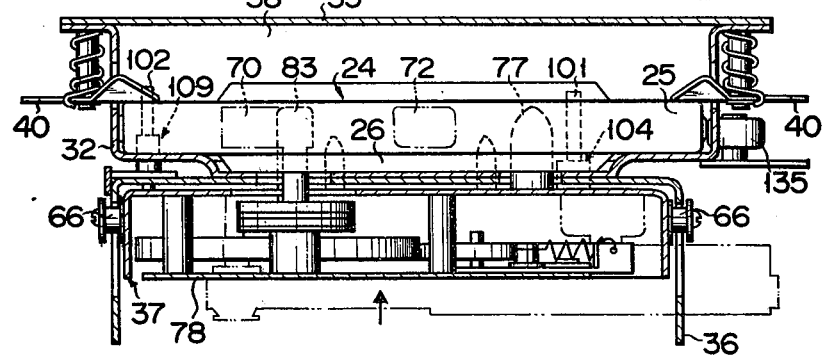
Figure 15A:
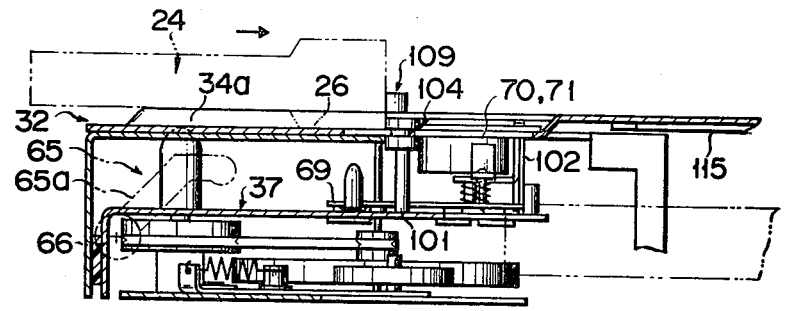
FIGS. 15A to 15D are sectional views showing the progressive insertion of the cassette.
Figure 15B:
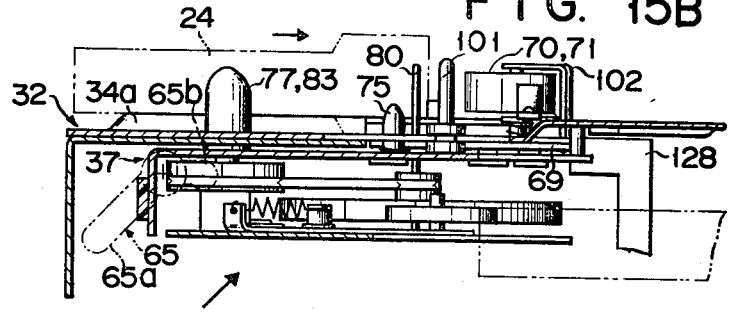
Figure 15C:
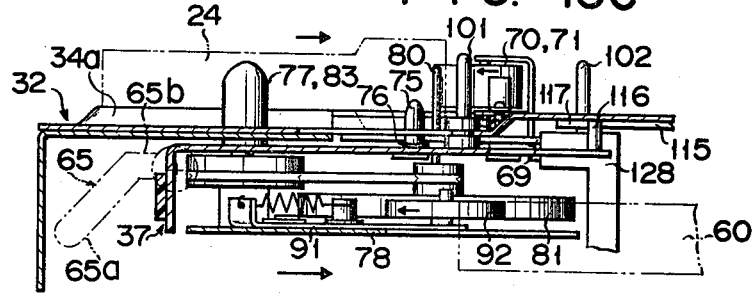

When the cassette is inserted into the free space 38 in the direction indicated by the arrow A of FIG. 3, then the guide members 40 guide the upper surface of the cassette body 25 as illustrated in FIG. 14B. The body 25 and thicker portion 26 of the cassette 24 abut against the engagement pin 111 of the second actuating member 109 and the upper collar 104b of the first actuating member 104 respectively, causing said actuating members 109, 104 to advance together with the forwarding pins 102, 101. Accordingly, the movable frame 37 is brought to an operative position ready for the drive of the cassette tape. The above-mentioned process of operation is schematically illustrated in FIGS. 15A to 15D. When the cassette 24 is initially pressed against the actuating members 104, 109, the movable frame 37 is still in the lowermost and rearmost inoperative position (FIG. 15A). When the cassette 20 is pushed further into the free space 38, then the actuating members 104, 109 advance the movable frame 37 by means of the forwarding pins 101, 102. At this time, the inclined portion 65a of the guide slot 65 guides the movable frame 37 obliquely upward by the guide roller 66, causing the movable frame 37 to travel from the position of FIG. 15A to that of FIG. 15B. The set pins 75, capstan 80 and reel shafts 77, 83 enter the corresponding holes of the cassette 24. The pinch roller 70 and magnetic head 71 pass through the hole 113 of the upper frame unit 32 into the free space 38. The movable plate 69 is pressed against the stopper 128 of the fast forwarding arm 124. When the cassette 24 moves more forward than the position shown in FIG. 15B, then the movable frame 37 advances along the horizontal portion 65b of the guide slot 65. Since, at this time, the movable plate 69 is kept in the position shown in FIG. 15B by the stopper 128, the taper of the introduced cassette 20 is pressed against the magnetic head 71 and tightly held between the pinch roller 70 and capstan 80 (FIG. 15C). The bottom plate 78 horizontally moves together with the movable frame 37, causing the idler 92 to abut against the fly-wheels 60, 81 (as indicated in a chain line in FIG. 10). The pin 116 of the movable frame 37 engages the pawl 117 of the lock arm 115, causing the movable frame 37 to be kept in the position shown in FIG. 15C. Upon advance of the movable frame 37, the forwarding pin 162 projecting through the hole 108 of the second actuating member 109 actuates the switch means (not shown) and in consequence a sound recording and reproducing circuit (not shown) for a casette tape.

Figure 15D:
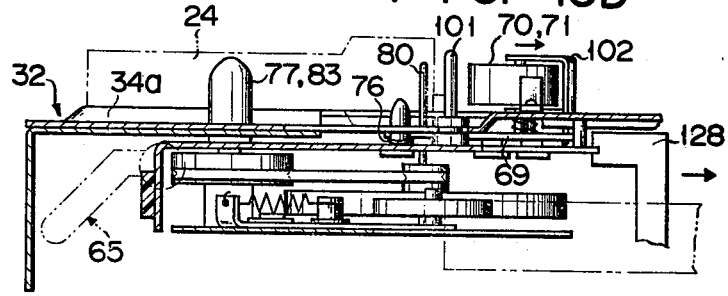

When a casette tape is fully wound about a takeup reel shaft 83, the shaft 83 is brought to rest by the high tension of that terminal portion of the tape which is stretched across both reel shafts. At this time, the solenoid-exciting circuit 90 actuates the solenoid 55 (FIG. 9), causing the lock arm 115 to rotate clockwise for release of the pin 116. The movable frame 37 is brought back to the original position shown in FIG. 15A by the tension springs 68. The cassette 24 is pushed backward by the actuating members 104, 109. At this time, the aforesaid switch means (not shown) is automatically thrown open. When the switch 59 of the tape track-changing mechanism 48 is closed with a desire to release the cassette 24 while the tape is running, the solenoid 55 is similarly excited to disengage the pin 116. When the rear end portion 124a of the fast forwarding arm 124 is pushed forward with a desire to effect the fast run of the tape, the stopper 128 is removed from the movable plate 69 as shown in FIG. 15D. The movable plate 69 is carried forward by the wire spring 76 to disengage the pinch roller 70 from the capstan 80, causing the takeup reel shaft 83 to carry out the fast run of the tape. Where the rear end portion 124a of the fast forwarding arm 124 is again pushed forward when the tape reaches any desired point, then the stopper 128 brings the movable plate 69 back to the position shown in FIG. 15C.

What we claim is:

1. A magnetic tape recording and/or reproducing apparatus for selectively operating an endless type cartridge which has a substantially flat surface on the underside or a coplanar type cassette which has a thicker portion at the middle of its underside and a pair of thinner portions at the lengthwise sides of the underside, said apparatus comprising:

a main frame having a single space for receiving the cartridge or the cassette and a bottom plate defining the bottom of the space, said bottom plate having a pair of raised portions on both lengthwise sides for guiding the underside of the cartridge or the thinner portions of the cassette inserted in the space and a depressed portion defined between the raised portions for receiving the thicker portion of the cassette;

a movable frame fitted with a cassette-tape operating means including:

a magnetic head;

means mounting the movable frame on the main frame for movement between a first position where the cassette-tape operating means is within said space and in operative position with a cassette inserted in said space and a second position wherein the cassette-tape operating means is out of said space;

spring means urging the movable frame to the second position; and, actuating means for shifting the movable frame to the first position against the spring means in response to the insertion of a cassette into the space, said actuating means including a first actuating member movably mounted on the depressed portion of the bottom plate and having a height not beyond the upper surfaces of the raised portions so that the first actuating member is moved by the thicker portion of the inserted cassette, thereby shifting the movable frame to the first position, but allows the free passage of the inserted cassette over the first actuating member, thereby maintaining the movable frame in the second position.

2. A magnetic tape recording and/or reproducing apparatus according to claim 1, wherein said bottom plate is formed with a first slot extending in the direction of the insertion of the cassette, and said first actuating member is engaged with the first slot to be moved therealong.

3. A magnetic tape recording and/or reproducing apparatus according to claim 2, wherein said movable frame is disposed below the bottom plate and has a forwarding pin upwardly projected therefrom, said first actuating member having a through hole into which the forwarding pin is inserted.

* * * * *